United States Patent
Mohindra et al.

(10) Patent No.: US 9,906,465 B2
(45) Date of Patent: *Feb. 27, 2018

(54) METHOD AND SYSTEM FOR POLICY BASED LIFECYCLE MANAGEMENT OF VIRTUAL SOFTWARE APPLIANCES

(71) Applicant: INTERNATIONAL BUSINESS MACHINES CORPORATION, Armonk, NY (US)

(72) Inventors: Ajay Mohindra, Yorktown Heights, NY (US); Anindya Neogi, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/197,284

(22) Filed: Jun. 29, 2016

(65) Prior Publication Data
US 2016/0308781 A1    Oct. 20, 2016

Related U.S. Application Data

(60) Continuation of application No. 13/460,037, filed on Apr. 30, 2012, now Pat. No. 9,426,090, which is a division of application No. 12/199,173, filed on Aug. 27, 2008, now Pat. No. 9,218,218.

(51) Int. Cl.
| | |
|---|---|
| *G06F 9/455* | (2006.01) |
| *H04L 12/927* | (2013.01) |
| *G06F 9/50* | (2006.01) |
| *H04L 12/24* | (2006.01) |

(Continued)

(52) U.S. Cl.
CPC .......... *H04L 47/803* (2013.01); *G06F 9/5077* (2013.01); *G06Q 50/10* (2013.01); *H04L 41/0893* (2013.01); *H04L 47/805* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,185,609 B1 | 2/2001 | Rangarajan et al. |
| 6,640,248 B1 | 10/2003 | Jorgensen |
| 6,880,157 B1 | 4/2005 | Havemose |

(Continued)

FOREIGN PATENT DOCUMENTS

| | | |
|---|---|---|
| WO | WO2007035544 A2 | 3/2007 |
| WO | WO2008002419 A2 | 1/2008 |

OTHER PUBLICATIONS

Office Action dated Sep. 11, 2014 for U.S. Appl. No. 13/460,037.
(Continued)

*Primary Examiner* — Gregory A Kessler
(74) *Attorney, Agent, or Firm* — Tutunjian & Bitetto, P.C.; Rabin Bhattacharya

(57) ABSTRACT

A system and method for managing dynamically allocated resources assigned to a service includes providing a service to be used by a plurality of sites in a federation. Usage information associated with the service is communicated to each of the plurality of sites. A disposition of the service is determined based on local policies and the usage information received from other sites by a service owner. The disposition of the service is updated across a plurality of sites in accordance with messages sent by the service owner to reduce resource usage.

20 Claims, 8 Drawing Sheets

(51) Int. Cl.
*G06Q 50/10* (2012.01)
*H04L 29/08* (2006.01)

(56) References Cited

U.S. PATENT DOCUMENTS

| 7,194,543 B2 | 3/2007 | Robertson et al. |
| 2007/0294676 A1 | 12/2007 | Mellor et al. |
| 2009/0210869 A1 | 8/2009 | Gebhart et al. |
| 2009/0300149 A1 | 12/2009 | Ferris et al. |

OTHER PUBLICATIONS

Goldshmidt, O., et al, Encompass: Managing Functionality. 2007 IEEE. IEEE International Parallel and Distributed Processing Symposium, IPDPS 2007. Mar. 2007, pp. 1-5.

Goscinski, A., et al. Resource Management In Large Distributed Systems. ACM SIGOPS Operating Systems Review. Oct. 1990. pp. 7-25.

Sapuntzakis, C., et al, Virtual Appliances For Deploying And Maintaining Software. USENIX. Proceedings of the 17th Large Installation Systems Administration Conference (LISA '03). Oct. 2003. pp. 181-194.

Okamura et al., Adaptive Resource Management System for Home-Area Networks; IEEE; 2001; pp. 187-192.

De Lucia et al., Effort Estimation for Corrective Software Maintenance; SEKE '02; Jul. 15-19, 2002; Ischia, Italy; pp. 409-416.

Holvoet et al., Beliefs, Desires and Intentions Through the Environment; AAMAS '06; May 8-12, 2006; Hakodate, Hokkaido, Japan; pp. 1052-1054.

Fong et al., Duality of Virtualization: Simplification and Complexity; ACM; 2007; pp. 96-97.

METHOD AND SYSTEM FOR POLICY BASED LIFECYCLE MANAGEMENT OF VIRTUAL SOFTWARE APPLIANCES

BACKGROUND

Technical Field

The present invention relates to distributed resource management and more particularly to systems and methods for the lifecycle management of distributed resources.

Description of the Related Art

Independent hosting sites are increasingly supporting virtualization. Virtualization permits running multiple applications and operating systems independently on a single server. Additionally, administrators can quickly move workloads from one virtual workspace to another. This assists in prioritizing application needs while maximizing server resources. The flexibility afforded in the allocation of computing capacity permits consolidation of applications and servers to ease management requirements and expenses.

The independent hosting sites can belong to different administrative domains. These sites can optionally join a federation to access a global state, or they can function independently. A federation is a collection of computers or resources that share a trusted relationship and permit information or resource sharing between sites in the federation. A federation service functions as a security token service. The act of installing the federation service component on a computer makes that computer a federation server.

Virtual software appliances (VSA), which are templatized disk images, are created to enable fast provisioning of software stacks. VSAs can be composed to create a solution deployed across multiple sites. VSAs are aimed to eliminate the installation, configuration and maintenance costs associated with running complex stacks of software. A VSA is a fully pre-installed and pre-configured application and operating system environment. Typically, a VSA will have a web interface to configure the inner workings of the appliance.

A query or request to be handled by accessing a federation of computers results in a solution being determined. A federation layer can provide location-transparency in solution delivery and enable use of global resources. Each solution has an associated dependency graph that maintains the prerequisites for deploying the solution. The solution dependency graph is stored in a service catalog.

Resources could be assigned to host VSAs used by other sites. As resources are provisioned in response to remote/local requests for VSAs, it is critical to manage the lifecycle of these VSAs to avoid resource waste. The current state of the art puts the onus of lifecycle management on system administrators. System administrators are expected to coordinate across the federation to perform lifecycle management of VSAs. Poor lifecycle management of VSAs could lead to resource waste as VSAs could be left active for solutions that are no longer in use.

With the increasing popularity of Service Oriented Architecture (SOA) based approaches for designing and deploying applications, there is a need to manage the lifecycle of composite business applications (CBA) that are mapped across a set of resources in a distributed environment. Lifecycle management involves the process of identifying active components being used by a CBA and reclaiming the resources associated with that component when the CBA is no longer active.

The current state of the art puts the onus of lifecycle management on system administrators. The system administrators are expected to coordinate across the federation to perform lifecycle management of CBAs. The main weakness of these approaches is that they are highly manual and fail to take into account the usage characteristics of the CBA when making lifecycle decisions about the individual components.

In conventional approaches, the lifecycle management approach does not take into account the inter-dependencies of software components within a CBA, and the usage characteristics of the CBA.

SUMMARY

A system and method for managing dynamically allocated resources includes providing a service to be used by a plurality of sites in a federation. A rate function associated with the service at each of the plurality of sites is communicated to a service host site. A disposition of the service is determined based on local policies and the rate function.

A system and method for managing dynamically allocated resources assigned to a service includes providing a service to be used by a plurality of sites in a federation. Usage information associated with the service is communicated to each of the plurality of sites. A disposition of the service is determined based on local policies and the usage information received from other sites by a service owner. The disposition of the service is updated across a plurality of sites in accordance with messages sent by the service owner to reduce resource usage.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
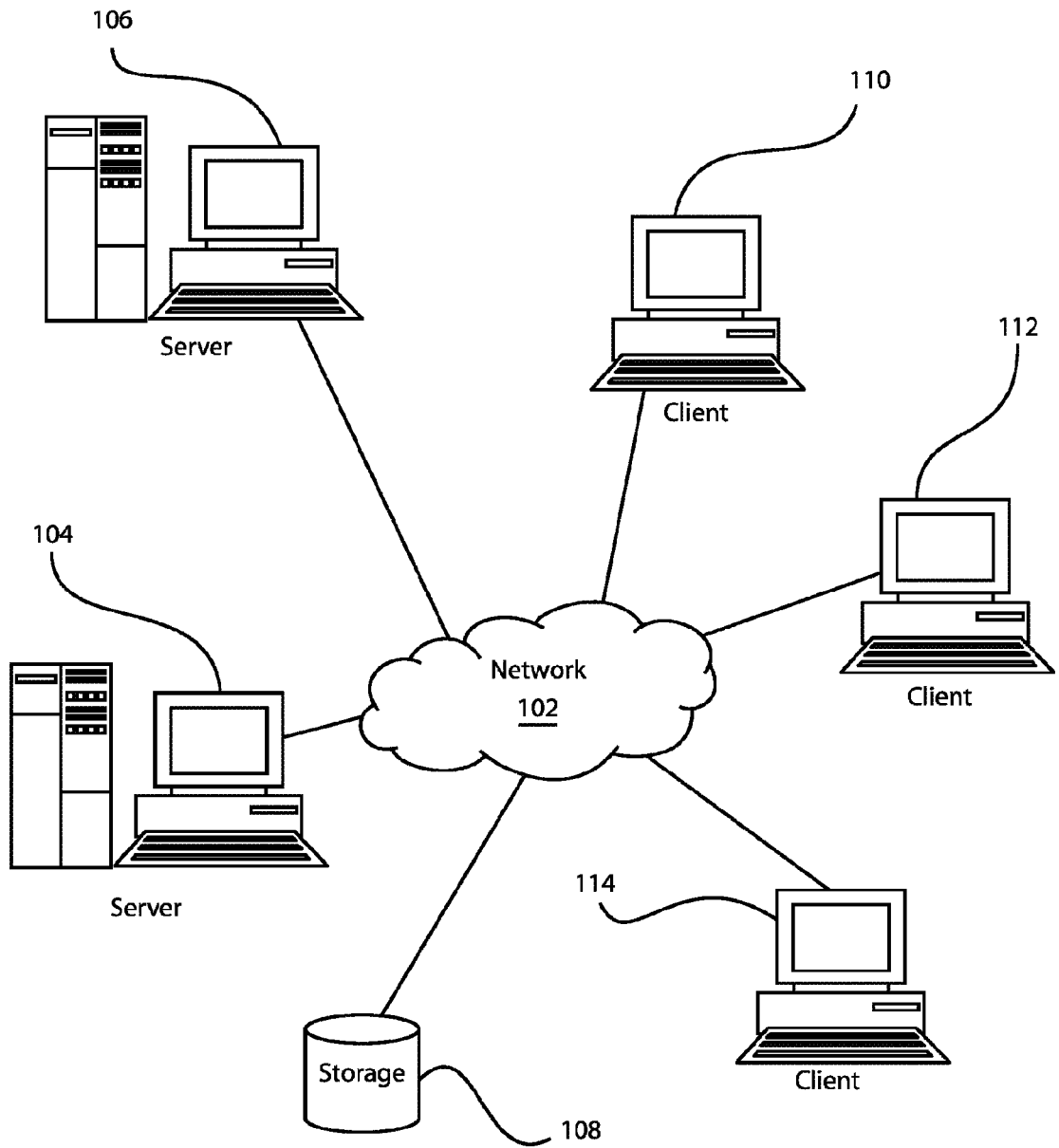
FIG. 1 is a representation of a network data processing system, which may be used to implement an exemplary embodiment.

In accordance with the present principles, a single virtual software appliance (VSA) or composition of VSAs in a certain topology can be configured to create a solution that runs in a federated environment. Each VSA that is configured and provisioned in the environment has a static provisioning state (Internet protocol (IP) address, hostname, configuration parameters, etc.) and a runtime dynamic state, a reference count that indicates the number of active solutions that are sharing the VSA.

A federated state management layer updates the global state with respect to a reference count (i.e., the dynamic state) of the VSA. In accordance with the present principles, we have multiple states of the VSA and a set of well-defined state transitions employed in managing a state of a VSA or other resource using lifecycle management.

In accordance with the present principles, a Policy manager (PM) is provided which maintains a lifecycle state of a VSA in a local configuration database. The PM is preferably maintained locally at each site, but is updated globally by communications between the sites. The VSA has a plurality of possible states. These states may be arranged and managed in a transition diagram for each VSA.

The state transitions are controlled by a policy manager component that initiates the state transition according to specific policies associated with the VSA. The policies can be a function of the site to which a VSA is assigned or based on other federation or contemporaneous conditions.

As provisioning logic, running in a centralized or distributed manner, identifies and provisions a VSA at a site or deletes a VSA from a site, the state information about the VSA is updated by the particular site's Policy Manager (PM). The PM coordinates the management of VSAs within a local site. Local decisions to delete a VSA are broadcast to other PMs so that their references to the VSA may be deleted and the global reference count of the VSA can be synchronized. PM Services deployed at other sites are assigned to the corresponding PM at each site.

This results in a lifecycle management process in distributed computing environments that takes into account such inter-dependencies, and usage characteristics between sites.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a representation of a network data processing system 100, which may be used to implement an exemplary embodiment, is illustratively shown. Network data processing system 100 includes a network of computers, which can be implemented using any suitable computer. Network data processing system 100 may include, for example, a personal computer, workstation or mainframe. Network data processing system 100 may employ a client-server network architecture in which each computer or process on the network is either a client or a server.

Network data processing system 100 includes a network 102, which is a medium used to provide communications links between various devices and computers within network data processing system 100. Network 102 may include a variety of connections such as wires, wireless communication links, fiber optic cables, connections made through telephone and/or other communication links.

A variety of servers, clients and other devices may connect to network 102. For example, a server 104 and a server 106 may be connected to network 102, along with a storage unit 108 and clients 110, 112 and 114, as shown in FIG. 1. Storage unit 108 may include various types of storage media, such as for example, computer hard disk drives, CD-ROM drives and/or removable media such as CDs, DVDs, USB drives, floppy disks, diskettes and/or tapes. Clients 110, 112 and 114 may be, for example, personal computers and/or network computers.

Client 110 may be a personal computer. Client 110 may comprise a system unit that includes a processing unit and a memory device, a video display terminal, a keyboard, storage devices, such as floppy drives and other types of permanent or removable storage media, and a pointing device such as a mouse. Additional input devices may be included with client 110, such as for example, a joystick, touchpad, touchscreen, trackball, microphone, and the like.

Clients 110, 112 and 114 may be clients to server 104, for example. Server 104 may provide data, such as boot files, operating system images, and applications to clients 110, 112 and 114. Network data processing system 100 may include other devices not shown.

Network data processing system 100 may comprise the Internet with network 102 representing a worldwide collection of networks and gateways that employ the Transmission Control Protocol/Internet Protocol (TCP/IP) suite of protocols to communicate with one another. The Internet includes a backbone of high-speed data communication lines between major nodes or host computers including a multitude of commercial, governmental, educational and other computer systems that route data and messages.

Network data processing system 100 may be implemented as any suitable type of network, such as for example, an intranet, a local area network (LAN) and/or a wide area network (WAN). FIG. 1 is intended as an example, and not as an architectural limitation for the present embodiments.

Figure 2:
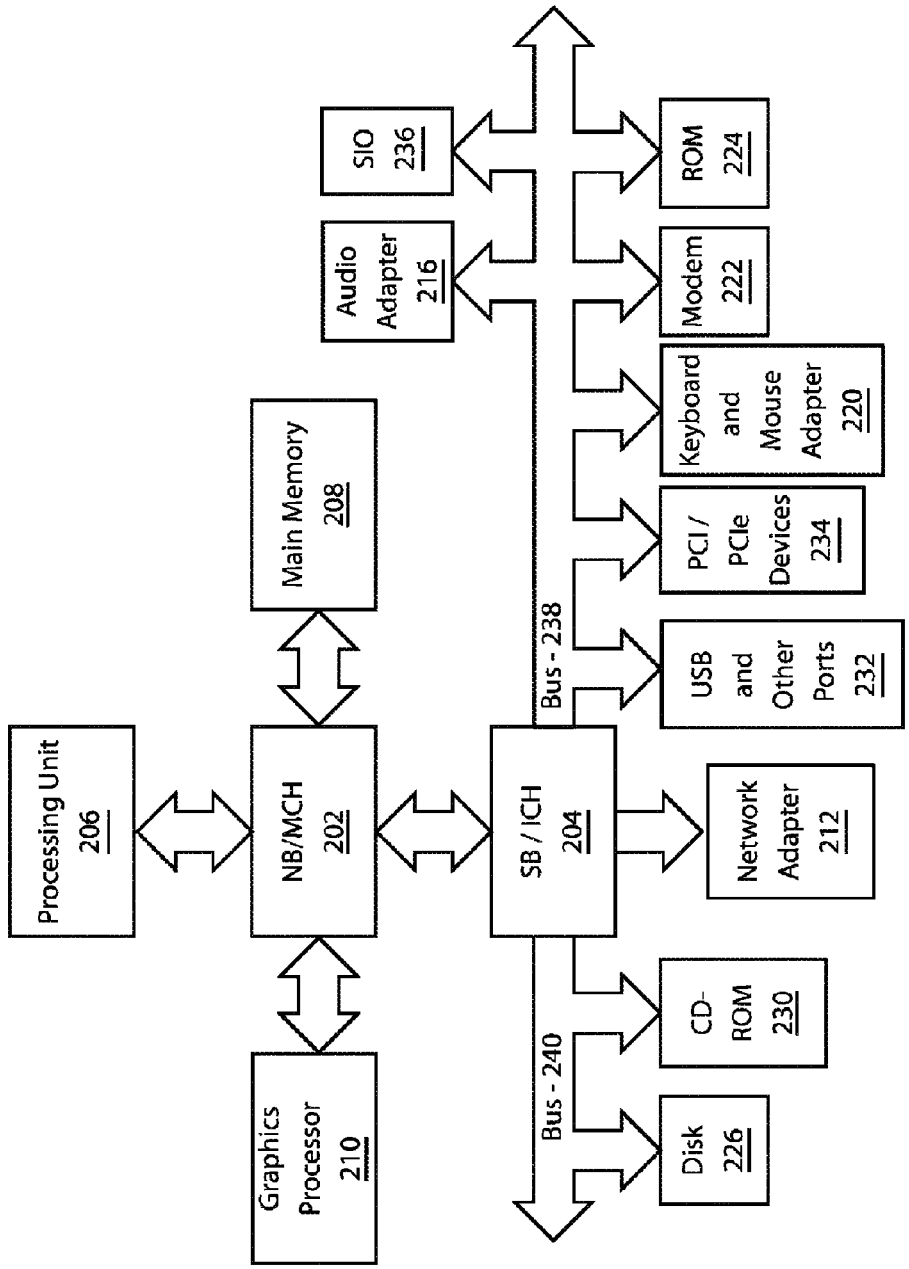
FIG. 2 is a block diagram of a data processing system, which may be used to implement an exemplary embodiment.

Referring to FIG. 2, a block diagram of a data processing system 200, which may be used to implement an exemplary embodiment is illustratively shown. Data processing system 200 is an example of a computer, such as server 104 or client 110 of FIG. 1, in which computer usable code or instructions implementing processes may be located.

In the depicted example, data processing system 200 employs a hub architecture including a north bridge and memory controller hub (NB/MCH) 202 and a south bridge and input/output (I/O) controller hub (SB/ICH) 204. Processing unit 206 that includes one or more processors, main memory 208, and graphics processor 210 are coupled to the north bridge and memory controller hub 202. Graphics processor 210 may be coupled to the NB/MCH 202 through an accelerated graphics port (AGP). Data processing system 200 may be, for example, a symmetric multiprocessor (SMP) system including a plurality of processors in processing unit 206. Data processing system 200 may be a single processor system.

In the depicted example, local area network (LAN) adapter 212 is coupled to south bridge and I/O controller hub 204. Audio adapter 216, keyboard and mouse adapter 220, modem 222, read only memory (ROM) 224, universal serial bus (USB) ports and other communications ports 232, and PCI/PCIe (PCI Express) devices 234 are coupled to south bridge and I/O controller hub 204 through bus 238, and hard disk drive (HDD) 226 and CD-ROM drive 230 are coupled to south bridge and I/O controller hub 204 through bus 240.

Examples of PCI/PCIe devices include Ethernet adapters, add-in cards, and PC cards for notebook computers. In general, PCI uses a card bus controller while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system, which may run on processing unit 206, coordinates and provides control of various components within data processing system 200. For example, the operating system may be a commercially available operating system such as Microsoft® Windows® XP (Microsoft and Windows are trademarks or registered trademarks of Microsoft Corporation). An object-oriented programming system, such as the Java™ programming system, may run in conjunction with the operating system and provides calls to the operating system from Java programs or applications executing on data processing system 200 (Java and all Java-based marks are trademarks or registered trademarks of Sun Microsystems, Inc.).

Instructions for the operating system, object-oriented programming system, applications and/or programs of instructions are located on storage devices, such as for example, hard disk drive 226, and may be loaded into main memory 208 for execution by processing unit 206. Processes of exemplary embodiments may be performed by processing unit 206 using computer usable program code, which may be located in a memory, such as for example, main memory 208, read only memory 224 or in one or more peripheral devices.

It will be appreciated that the hardware depicted in FIGS. 1 and 2 may vary depending on the implementation. Other internal hardware or peripheral devices, such as flash memory, equivalent non-volatile memory, or optical disk drives and the like, may be used in addition to or in place of the depicted hardware. Processes of embodiments of the present invention may be applied to a multiprocessor data processing system.

Data processing system 200 may take various forms. For example, data processing system 200 may be a tablet computer, laptop computer, or telephone device. Data processing system 200 may be, for example, a personal digital assistant (PDA), which may be configured with flash memory to provide non-volatile memory for storing operating system files and/or user-generated data. A bus system within data processing system 200 may include one or more buses, such as a system bus, an I/O bus and PCI bus. It is to be understood that the bus system may be implemented using any type of communications fabric or architecture that provides for a transfer of data between different components or devices coupled to the fabric or architecture. A communications unit may include one or more devices used to transmit and receive data, such as modem 222 or network adapter 212. A memory may be, for example, main memory 208, ROM 224 or a cache such as found in north bridge and memory controller hub 202. A processing unit 206 may include one or more processors or CPUs.

Methods for automated provisioning according to exemplary embodiments may be performed in a data processing system such as data processing system 100 shown in FIG. 1 or data processing system 200 shown in FIG. 2.

It is to be understood that a program storage device can be any medium that can contain, store, communicate, propagate or transport a program of instructions for use by or in connection with an instruction execution system, apparatus or device. The medium can be, for example, an electronic, magnetic, optical, electromagnetic, infrared, or semiconductor system (or apparatus or device) or a propagation medium. Examples of a program storage device include a semiconductor or solid state memory, magnetic tape, removable computer diskettes, RAM (random access memory), ROM (read-only memory), rigid magnetic disks, and optical disks such as a CD-ROM, CD-R/W and DVD.

A data processing system suitable for storing and/or executing a program of instructions may include one or more processors coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution.

Data processing system 200 may include input/output (I/O) devices, such as for example, keyboards, displays and pointing devices, which can be coupled to the system either directly or through intervening I/O controllers. Network adapters may also be coupled to the system to enable the data processing system to become coupled to other data processing systems or remote printers or storage devices through intervening private or public networks. Network adapters include, but are not limited to, modems, cable modem and Ethernet cards.

Figure 3:
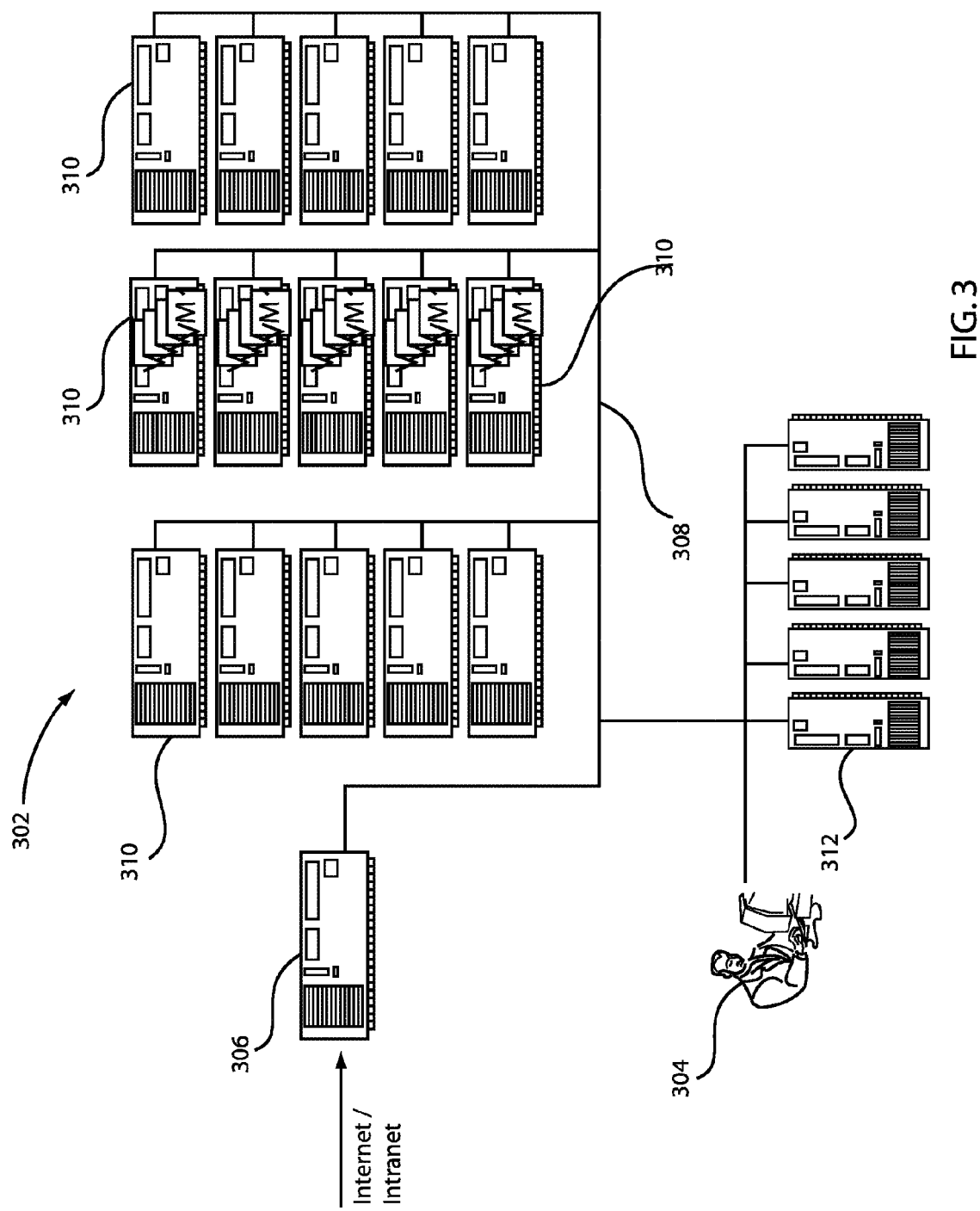
FIG. 3 depicts a schematic representation of a service delivery environment, which may be used to implement an exemplary embodiment.

Referring to FIG. 3, a schematic representation of a service delivery environment 300, which may be used to implement an exemplary embodiment is illustratively shown. Service delivery environment 300 includes a farm of physical servers 302, DMZ (demilitarized zone) 306 and management servers 312. The term "demilitarized zone" or acronym "DMZ" refers to a network area that sits between an organization's internal network and an external network, such as the Internet.

User requests from the Internet or an intranet are received by a router device. For example, a router device may be located within the DMZ 306. The router device may be implemented by a reverse proxy, such as IBM's WebSeal product. User requests may be directed via a network 308 to a provisioning solution that is hosted on a collection of real or virtual machines 310 running on a server farm 302. Management servers 312 may be used to manage the server farm 302 and are coupled via network 308 to the physical servers 310 of farm 302. The management servers 312 may be used by system administrators 304 to manage and monitor the server farm 302. Software running on the management servers 312 may assist with various tasks such as software metering, application provisioning, monitoring all (or selected) applications, and problem determination of the server farm.

Figure 4:
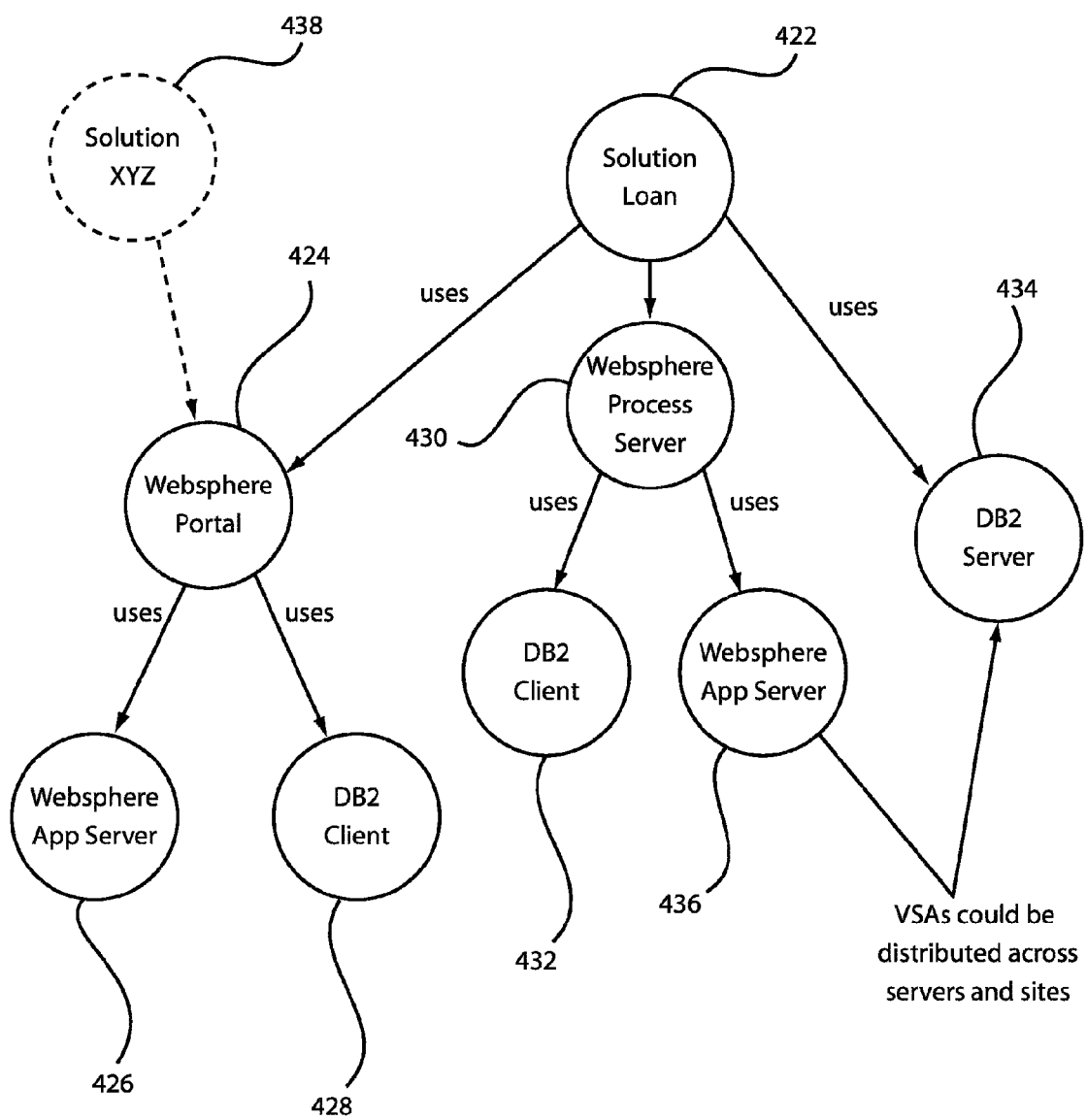
FIG. 4 depicts an example of a logical application structure including a resource dependency characterization of a sample application, according to an exemplary embodiment.

Referring to FIG. 4, an example of a logical application structure 400 including a resource dependency characterization (dependency graph) of a sample application, according to an exemplary embodiment. The example logical application structure 400 is a dependency graph including resource dependency characteristics of the sample application. However, it is to be understood that any suitable logical application structure may be employed.

A dependency graph may be expressed as an XML file that highlights the relationships and dependencies between different components. In the example depicted in FIG. 4, a "Loan Solution" 422 depends on the availability of three components, WebSphere Portal Server 424, WebSphere Process Server 430 and DB2 server 434. The WebSphere Portal Server 424 depends on the availability of WebSphere Application Server 426 and DB2 client 428. The WebSphere Process Server depends upon DB2 client 432 and WebSphere Application Server 436. Another application "Solution XYZ" 438 has a dependency on WebSphere Portal Server 424, and may share a component instance of the WebSphere Portal with the "Loan solution" 422. The solution dependency graph 400 may be distributed across servers and sites, and indicates the sharing relationships and dependencies of solutions. As such VSAs may also be distributed across servers and sites as well.

Figure 5:
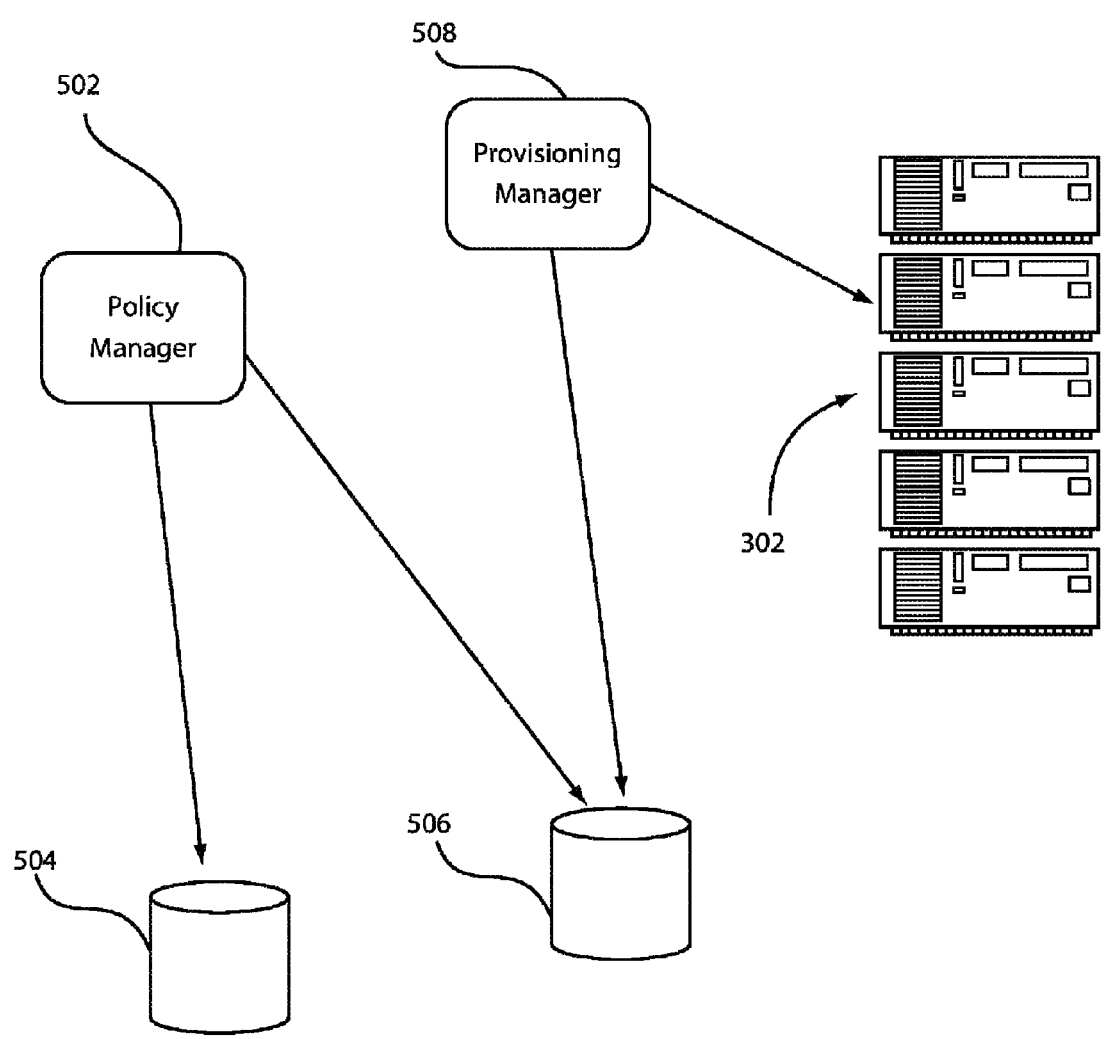
FIG. 5 is a logical architecture of the policy manager component in accordance with the present principles.

Referring to FIG. 5, a logical architecture 500 of a Policy Manager component 502 is illustratively shown. The architecture 500 includes a Solution repository 504 and a Deployment repository 506. The Solution repository 504 includes metadata and dependency graphs for each composite business solution (CBS). The terms CBS and CBA are used interchangeably herein. The Deployment repository 506 includes the state of each virtual software appliance (VSA) that is present in the server farm (302), and images of the deactivated appliances. A VSA is a disk image of an application or part of an application (component) and its middleware stack running in a virtualized environment. A VSA can be archived and restarted on any other physical server running the same virtualization environment given other dependencies and resources are met.

The Policy manager 502 uses a Provisioning Manager 508 to perform any task on the VSAs. A CBA can be composed of multiple VSAs, say one for each component of the application. A same VSA image can be shared across CBAs. Even active VSAs can be shared across CBAs if the VSAs are multi-tenant.

Figure 6:
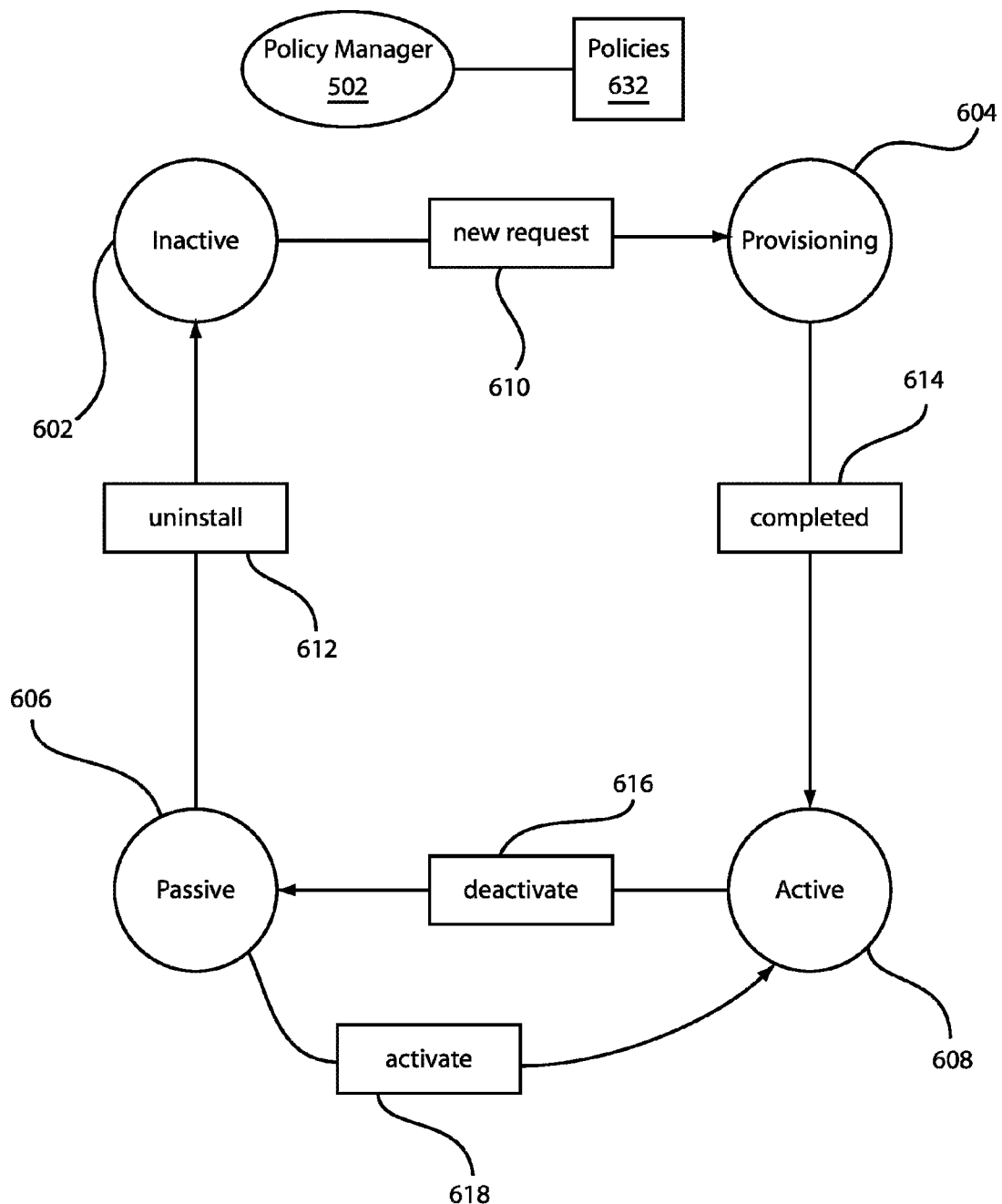
FIG. 6 is a diagram showing a site maintaining a life cycle of a resource including a state diagram for managing a state of a virtual software appliance in accordance with one illustrative embodiment.

Referring to FIG. 6, states and state transitions of the VSAs are illustratively shown. A Policy manager (PM) 502 is illustratively shown in the form of a lifecycle state and transition diagram, and policies 632 for managing the lifecycle of a virtual software appliance (VSA) at a particular site are also depicted. The PM 502 maintains lifecycle states (e.g., active, inactive, passive, provisioning, etc.) of the virtual software appliance (VSA) in a local configuration database or memory location. The PM 502 is preferably maintained locally at a site in a system or federation that includes a plurality of sites. It should be understood that the PM will be described in terms of a VSA, but other shared resources (hardware device and/or services) may also benefit from the dynamic management methods disclosed herein.

The VSA has a plurality of possible states, e.g., an active state 608, an inactive state 602, a passive state 606, and a provisioning state 604, which are illustratively depicted. These states may be arranged and managed by a local PM. State transitions, e.g., new request 610, uninstall 612, completed 614, deactivate 616 and activate 618, are controlled by the policy manager 502 that initiates the state transitions according to specific policies 632 associated with the VSA. The policies 632 can be a function of the site to which a VSA is assigned or based on other federation or contemporaneous conditions.

Provisioning logic (not shown) handles the implementation of the policies 632 for state transitions. The logic may be disposed in a centralized manner or in a distributed manner, and may include software or hardware. The logic identifies and provisions a VSA at a site or deletes a VSA from a site. The state information about the VSA is updated by the particular site's Policy Manager (PM) 502. The PM 502 coordinates the management of VSAs within the local site. Local decisions to delete a VSA are broadcast to other PMs so that their references to the service represented by the deleted VSA may be deleted and a global reference count of the VSA is synchronized. The global reference count may be any measure or usage or status of a distributed resource. For simplicity, the global reference as described in the illustrative example here may include a number of solutions in a particular state for a given VSA.

At the time of deployment, each root service (e.g., a composite business service or solution (CBS)) is assigned to a policy manager for managing a given service. Services deployed at other sites are assigned a corresponding PM at each site.

A single VSA or composition of VSAs in a certain topology can be configured to create a solution that runs in a federated environment. Each VSA that is configured and provisioned in the environment has a static provisioning state (IP address, hostname, configuration parameters, etc.) and a runtime dynamic state. The reference count indicates the number of active solutions that are sharing the state. A federated state management layer updates the global state with respect to the reference count of a VSA. The VSA advantageously can have multiple states, and a set of well-defined state transitions.

Each site maintains the lifecycle state of the VSA in the local configuration. The lifecycle state transitions may include the following example policies 632.

Inactive to Provisioning: The policy manager 502 determines the type of resources that should be allocated to the VSA based on the site/service that triggered provisioning 604.

Passive to Active: The policy manager 502 may decide to reactivate a passive application container if the passive container can satisfy transient needs of an application. For example, suppose the application container uses a new database container or the application container can reuse an existing VSA that is in a deactivated state. The new the application container will fit better in terms of performance, but the deactivated one can be brought online faster though it is not the best fit. If time is of the essence here, the policy manager 130 may choose the older one and take the risk on performance.

Active to Passive: Any resource that shows inactivity for a predefined period (e.g., 7 days) is deactivated and put in the passive state 606. This transition may be triggered if a free resource pool is running low.

Passive to Inactive: This policy transition may be implemented if a predefined period of no use has elapsed, if the free resource pool is running low, etc.

The states for the VSA will now be described in greater detail.

Inactive state (602): The initial state of a resource (VSA) is marked inactive when it resides only as an entry in a service catalog with appropriate image and meta-data, or an image template ready for configuration and deployment. No resources are allocated in the inactive state.

Passive state (606): In the passive state, the runtime state is check pointed on persistent storage. Deactivation may include calling any specific quiescent operation for the software layers in the VSA. In this state, memory and CPU resources are reclaimed and snapshot storage is allocated. While in the passive state, the local PM also decrements the reference count for a VSA if the VSA has been in the passive state for a predetermined number of days or some other set amount of time.

Provisioning state 604: As requests to provision a new VSA are received by the site, the PM marks the state of the resource to provisioning (604), and then active (608), and increments the reference count for the VSA.

Active state 608: The active state means that the VSA is currently active. Additional active states or passive states are also possible if the VSA is moved to a different server or site based on hosting 'cost', e.g., it may be moved to a cheaper, low performance server or archived on cheaper, high latency storage.

VSA uninstall 612 transition: When an administrator removes or "uninstalls" a solution from service or a reference count of a VSA falls to 0, the PM also updates the clean up of associated VSAs by decrementing the reference count on each associated VSA. If the VSA is managed by a remote site then a request is sent to the Policy manager at the remote site.

Deactivate transition 616: This transition is usage based, the PM periodically monitors the usage of the resource by querying a monitoring service. Any resource that shows inactivity for a predefined period (e.g., 7 days) is "deactivated" and put in the passive state 606.

Activate transition 618: Passive VSAs can be activated if a new request 110 is received for that VSA. The new request is a result of a new provisioning request for a service represented by the VSA.

Completed transition 614: When a new VSA has been provisioned and moves to the active state 608. The provisioning state 604 has completed 614.

Inactive 602 is the initial state. The initial state of a resource is marked inactive when it resides only as an entry in the service catalog with appropriate image and meta-data or image template ready for configuration and deployment. No resources are allocated to the VSA. As requests to provision a new VSA are received by the site, the Policy Manager 502 marks the state of the resource to provisioning 604 and then active 608, and increments the reference count for the VSA.

When an administrator removes a solution from service or reference count of a VSA falls to 0, the Policy Manager 502 also updates the clean up of associated VSAs by decrementing the reference count on each associated VSA. If the VSA is being used by CBAs located at a remote site then a request is sent to the Policy manager 502 at the remote site. The Policy manager 502 may deactivate a VSA based on usage profile. The Policy manager 502 periodically monitors the usage of the resource by querying the monitoring service. Any resource that shows inactivity for a predefined period (say, e.g., 7 days) is deactivated and put in passive state 606. Passive VSAs can be activated if a new request 610 is received for that VSA. In the passive state 606, a runtime state is checkpointed on persistent storage. Deactivation 616 may include calling any specific quiesce operation for the software layers in the VSA, e.g., memory and CPU resources reclaimed, snapshot storage allocated, etc.

While in the passive state 606, the Policy manager 502 also decrements the reference count for a VSA if the VSA has been in passive for a predetermined number of days, and transitions the state to inactive 602. Additional active states or passive states are also possible if the VSA is moved to a different server or site based on hosting 'cost', e.g., it may be moved to a cheaper, low performance server or archived on cheaper, high latency storage.

Figure 7:
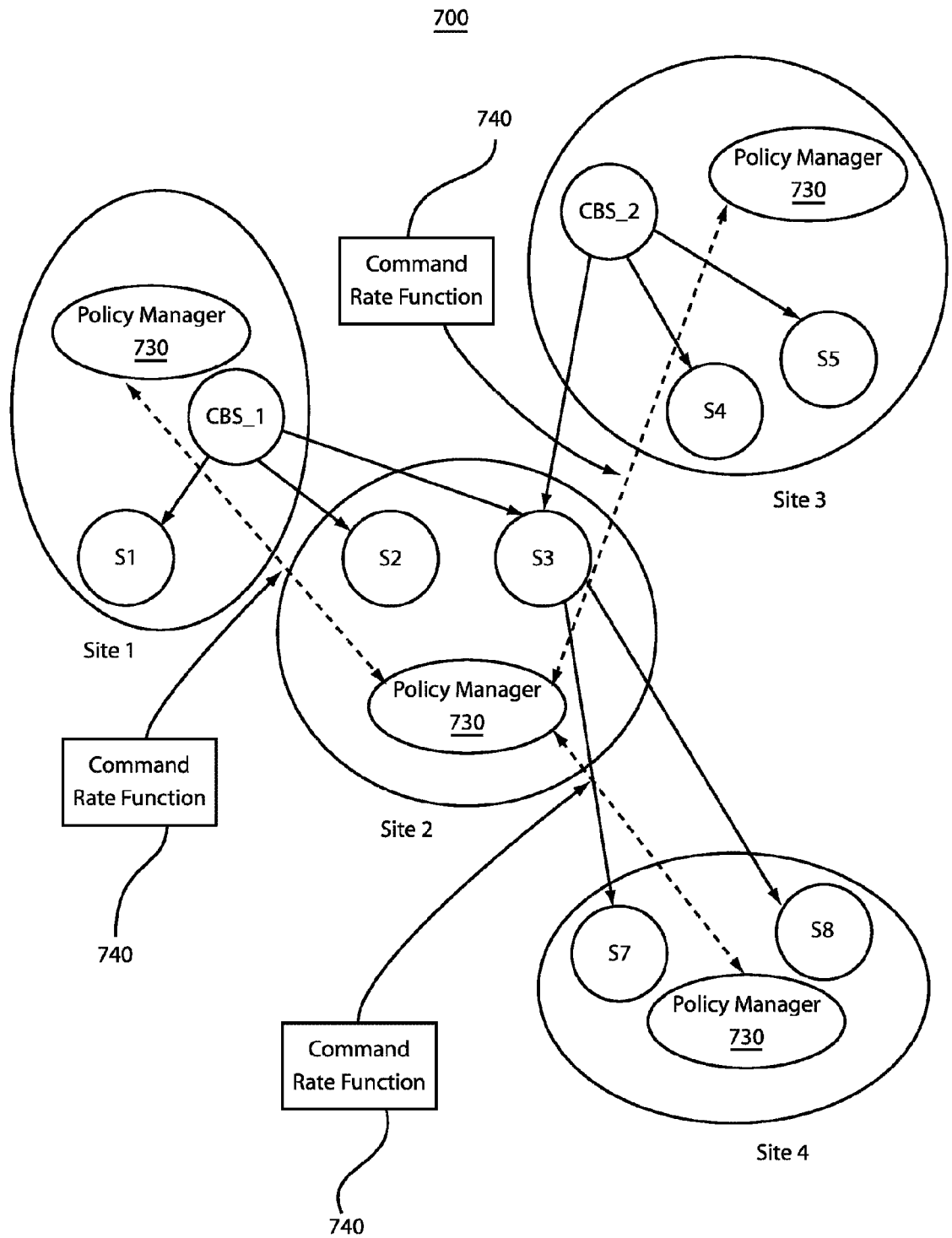
FIG. 7 is a block diagram showing a federation managing remote resources through interactions between policy managers in accordance with one illustrative embodiment.

Referring to FIG. 7, a communication pattern between Policy managers 730 located in a distributed environment is illustratively shown. A federation 700 of sites (sites 1-4) and servers (S1-S8) are illustratively depicted to demonstrate interactions among components of the federation. When an administrator selects a composite business service (CBS) such as CBS_1 or CBS_2 for deletion or deactivation, a policy manager 730, associated with the site (e.g., sites 1-4) where the CBS is deployed, determines the set of remote services that the CBS uses. For example, a CBS_1 on site 1 uses servers S1 and S2 on site 2 in its set of remote services.

For each remote CBS, each remote policy manager 730 that no longer needs that particular service sends a notification to an owning policy manager for that site indicating that the component service is no longer needed. The policy manager 730 also sends to the owning policy manage a rate function 740 that is derived by profiling long term behavior of the component usage. For example, if CBS_1 is no longer needed by site 2. The policy manager 730 of site 2 sends a notification and usage information to the policy manager 730 at site 1.

If CBS_1 is being considered for deletion, policy managers 730 at sites 2, 3 and 4 send notification messages to the policy manager 730 of site 1 (the owning policy manager) that the service is no longer needed by their site and/or usage information for that the policy manager of site 1 can make a state decision. Further, a command rate function 740 is sent to the policy manager 730 at site 1 from the policy managers 730 of sites 2, 3 and 4.

Each owning policy manager 730 receives the rate function 740 for the component service and uses the function 740 to determine the disposition of the service based on the VSA lifecycle and local policies. The command rate function is a mathematical representation of the usage pattern of the service. It could be a function and not just a scalar rate value (service calls/time), for example if one wants to represent time-varying usage, day-night/seasonal/hourly patterns, caller location-based patterns, etc.

For shared components, the rate functions 740 are received from multiple callee policy managers 730 and are aggregated to make a decision as to whether the service should be deactivated or whether a state should be changed for that component.

Site 1 has a composite business application/service CBS_1, and component S1. Site 2 has components S2 and S3 that are invoked by CBS_1 (as shown by solid arrows). Site 3 has a CBS_2 and components S4 and S5. Site 4 has two components S7 and S8. Note that component S3 is shared between applications CBS_1 and CBS_2, and components S7 and S8 are both indirectly shared via component S3. The Policy managers 730 at the four sites communicate lifecycle management messages as depicted by dashed arrows. The message includes a command and a rate function.

The message structure 740 includes commands (e.g., delete, deactivate, etc. and a rate function (e.g., usage data). Based on the disposition of the caller components or CBA, the command could either be delete or deactivate. The rate function represents usage data for each service at local level and exchange this info (say, calls/minute, active usage/min, etc.), and this can be exchanged also for aggregation across sites.

For example, the rate function of a component at a site may capture how the calls/minute to the component varies throughout the day or the distribution of the parameter for each site the rate function is employed at. The individual functions can then be aggregated at the local policy manager of the component to determine overall usage for the day or the aggregate distribution. This can be used to determine at some time t, if the component should be put in some lower state of activity just because it is not used at time t. E.g., if we expect heavy activity throughout the day based on the aggregate rate function we may choose to keep the component in the active state.

Figure 8:
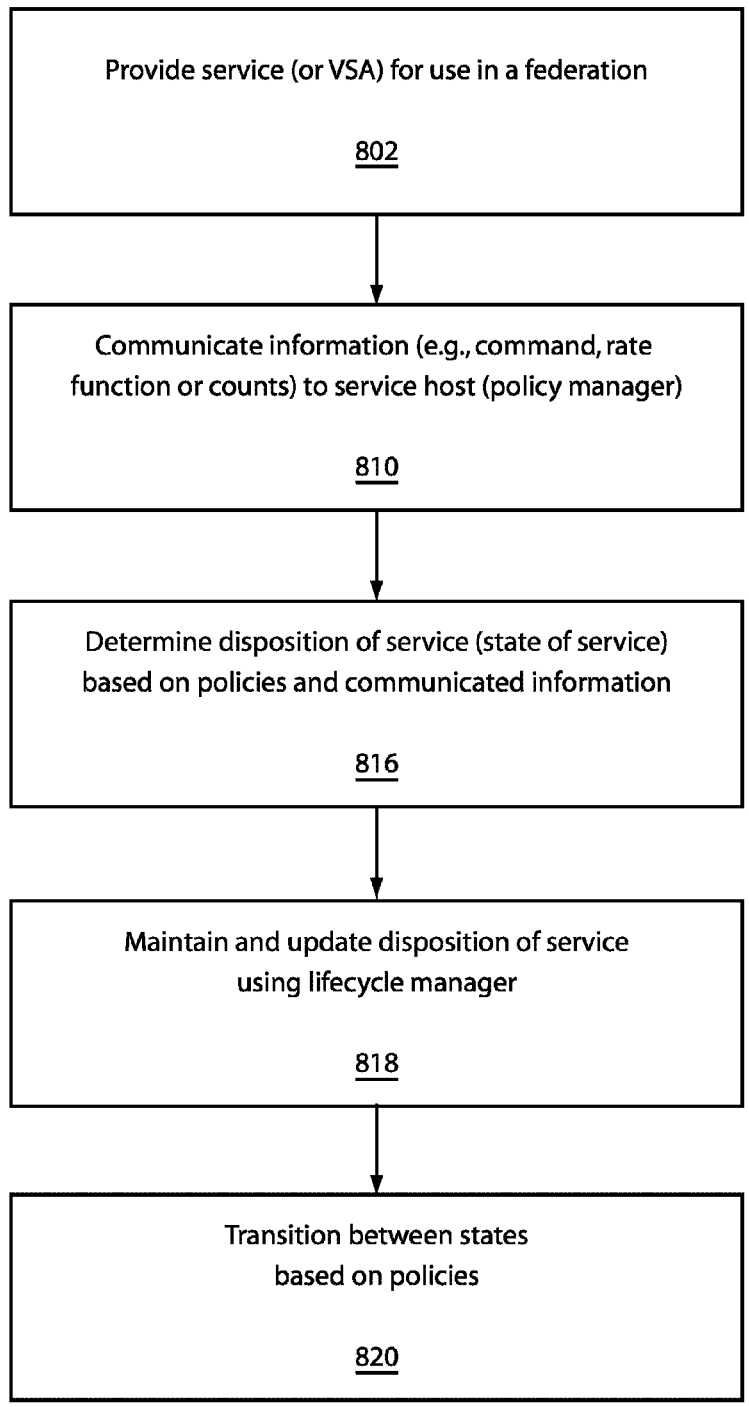
FIG. 8 is a block/flow diagram showing a system/method for managing lifecycles of resources including composite business services in accordance with one illustrative embodiment.

Referring to FIG. 8, a system/method for managing dynamically allocated resources is illustratively depicted. In block 802, a service is provided to be used by a plurality of sites in a federation. The service may include a composite business service (CBS), a virtual software appliance, etc.

In block 810, a command, rate or count information, such as a rate function or historic usage information associated with the service at each of the plurality of sites is communicated to a host site. The command, rate function or other information is preferably communicated between policy managers of sites using the service and a policy manager of a site hosting the service.

In block 816, a disposition of the service is determined based on local policies, commands and the rate function. In block 818, the disposition of the service is maintained and updated based upon a Policy manager assigned to the service. The Policy manager maintains a plurality of states such that the disposition is a state determined in accordance with the local policies, commands and the rate functions from other sites employing the service. For example, the states may include one or more of active, inactive, provisioning, passive, etc.

In block 820, transitioning between the states is permitted by employing policy triggered transitions and commands. The policy triggered transitions may include one or more of activate, deactivate, new request, completed, uninstall, etc. The transitions may be activated by performing attribute matches based upon the most current attributes and the attribute thresholds or levels as dictated by the policies. If the attribute matching indicates that a transition is needed, the transition to a new state is triggered.

Having described preferred embodiments of a system and method for policy based lifecycle management of virtual software appliances (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for managing dynamic resources used by a virtual software appliance (VSA), comprising:
representing characteristics of a virtual software appliance employed in a distributed environment;
representing policies that affect the VSA in the distributed environment; and
transitioning a state of the VSA, and determining a disposition of services based on the policies and historic usage information, the state being determined by local and global attribute matching in accordance with the policies.

2. The method as recited in claim 1, wherein the states include active and passive and transitioning includes transitioning from the active state to the passive state when resource usage inactive for a predefined period of time.

3. The method as recited in claim 1, wherein the states include active and passive and transitioning includes transitioning from the active state to the passive state when resource usage indicates hyperactivity for a predefined period of time.

4. The method as recited in claim 1, further comprising deleting the virtual software appliance if resource usage inactivity satisfies an inactivity policy.

5. The method as recited in claim 1, further comprising maintaining and updating the disposition of the VSA based upon a Policy manager assigned to the VSA.

6. The method as recited in claim 5, wherein the Policy manager comprises a plurality of states such that the state is determined in accordance with local policies and rate functions from other sites employing the VSA.

7. The method as recited in claim 6, wherein the states include one or more of active, inactive, provisioning and passive.

8. The method as recited in claim 6, further comprising transitioning between the states by employing policy triggered transitions, wherein the policy triggered transitions include one or more of activate, deactivate, and uninstall.

9. A non-transitory computer computer-readable medium comprising a computer-readable program for managing dynamic resources used by a virtual software appliance (VSA), wherein the computer-readable program when executed on a computer causes the computer to perform the steps of:
representing characteristics of a virtual software appliance employed in a distributed environment;
representing policies that affect the VSA in the distributed environment; and
transitioning a state of the VSA, and determining a disposition of services based on the policies and historic usage information, the state being determined by local and global attribute matching in accordance with the policies.

10. The computer-readable storage medium as recited in claim 9, wherein the states include active and passive and transitioning includes transitioning from the active state to the passive state when resource usage inactive for a predefined period of time.

11. The computer-readable storage medium as recited in claim 9, wherein the states include active and passive and transitioning includes transitioning from the active state to the passive state when resource usage indicates hyperactivity for a predefined period of time.

12. The computer-readable storage medium as recited in claim 9, further comprising deleting the virtual software appliance if resource usage inactivity satisfies an inactivity policy.

13. The computer-readable storage medium as recited in claim 9, further comprising maintaining and updating the disposition of the VSA based upon a Policy manager assigned to the VSA.

14. The computer-readable storage medium as recited in claim 13, wherein the Policy manager comprises a plurality of states such that the state is determined in accordance with local policies and rate functions from other sites employing the VSA.

15. The computer-readable storage medium as recited in claim 14, wherein the states include one or more of active, inactive, provisioning and passive.

16. The computer-readable storage medium as recited in claim 14, further comprising transitioning between the states by employing policy triggered transitions, wherein the policy triggered transitions include one or more of activate, deactivate, and uninstall.

17. A method for managing dynamic resources used by a virtual software appliance (VSA), comprising:
   representing characteristics of a virtual software appliance employed in a distributed environment;
   representing policies that affect the VSA in the distributed environment; and
   transitioning a state of the VSA and determining a disposition of services based on the policies and historic usage information, the state being determined by local and global attribute matching.

18. The method as recited in claim 17, wherein states include active and passive and transitioning includes transitioning from an active state to a passive state when resource usage inactive for a predefined period of time.

19. The method as recited in claim 17, wherein states include active and passive, and transitioning includes transitioning from the active state to the passive state when resource usage indicates hyperactivity for a predefined period of time.

20. The method as recited in claim 17, further comprising deleting the virtual software appliance if resource usage inactivity satisfies an inactivity policy.

* * * * *